United States Patent Office 3,368,001
Patented Feb. 6, 1968

3,368,001
ALKYL SULFONAMIDE PHOSPHATES AND PHOSPHONATES
Karoly Szabo, Orinda, Llewellyn W. Fancher, Lafayette, and David J. Broadbent, San Jose, Calif., assignors to Stauffer Chemical Company, New York, N.Y., a corporation of Delaware
No Drawing. Filed Sept. 25, 1964, Ser. No. 399,369
6 Claims. (Cl. 260—944)

ABSTRACT OF THE DISCLOSURE

Compounds of the formula

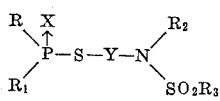

in which R and $R_1$ are lower alkoxy or lower alkyl groups; $R_2$ is hydrogen, lower alkyl or lower haloalkyl; $R_3$ is lower alkyl (when $R_2$ is hydrogen) and $R_3$ is lower alkyl, phenyl or halophenyl (when $R_2$ is lower alkyl or lower haloalkyl); X is oxygen or sulfur; and Y is a divalent lower alkylene or lower alkylalkylene group. The compounds are useful in killing pests such as insects and mites.

This invention relates to new and novel class of phosphorous containing organic compounds and to the use of same as insecticides and acaricides. More specifically, this invention relates to certain new substituted alkyl sulfonamide phosphates and phosphonates and to the use of said compounds in insecticidal compositions. The compounds are particularly valuable for their insecticidal and miticidal properties. Fungicidal activity has also been observed for compounds of the present invention.

This invention relates to compounds corresponding to the general formula

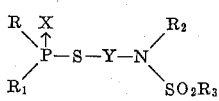

wherein R and $R_1$ are selected from the group consisting of lower alkoxy and lower alkyl, $R_2$ is selected from the group consisting of hydrogen, lower alkyl, lower haloalkyl; when $R_2$ is hydrogen $R_3$ is lower alkyl and when $R_2$ is lower alkyl and lower haloalkyl $R_3$ is selected from the group consisting of lower alkyl, phenyl and halophenyl; X is selected from the group consisting of sulfur and oxygen and Y is selected from the group consisting of divalent lower alkylene and lower alkylalkylene. The invention includes methods of preparation, utility and application of said compounds.

The various methods of preparing representative compounds of the present invention, as well as the manner of utilizing them in insecticidal compositions, are illustrated in the following non-limiting examples.

EXAMPLE 1

N - [2 - (O,O - diethyl - phosphorodithioyl) - propyl]-methanesulfonamide.—Potassium - O,O-diethylphosphorodithioate (11.2 g., 0.05 M), N-(2-chloropropyl)-methanesulfonamide (8.6 g., 0.05 M), and methylethyl ketone (40 ml.) were brought together in a reaction flask equipped with stirrer, reflux condenser and thermometer. The mixture was refluxed for 3 hours, during which time potassium chloride precipitation was noted. The mixture was allowed to cool to ambient temperature and was filtered. The filtrate was washed with 5% sodium bicarbonate solution and then washed with water. The filtrate was then dried over anhydrous magnesium sulfate and stripped of solvent by heating to 110° C. at 20 mm. A clear yellow liquid was obtained in a yield of 13 g. which analyzed in good agreement with the above compound, $n_D{}^{25}=1.4957$.

EXAMPLE 2

N - [2 - (O - ethyl - ethylphosphonodithioyl)-propyl]-methanesulfonamide.—O - ethyl - ethylphosphonodithioic acid (8.7 g.), sodium methoxide (2.7 g.), N-(2-chloropropyl)methanesulfonamide (8.6 g.) and ethanol (50 ml.) were combined in a reactor and refluxed for 12 hours. The precipitated salt was filtered off, and the solvent removed at reduced pressure. The residue was taken up in benzene (50 ml.), washed with 5% sodium bicarbonate solution and water and dried over anhydrous magnesium sulfate. After removal of the volatile solvent at reduced pressure, a yield of 10 g. of yellow oily product was obtained, $n_D{}^{25}=1.5196$.

EXAMPLE 3

N - [2 - (O - ethyl - ethylphosphonodithioyl) - ethyl]-methanesulfonamide.—O - ethyl - ethylphosphorodithioic acid (8.5 g.), N-(2-chloroethyl)methanesulfonamide (11.8 g.), triethylamine (5.1 g.) and acetone (50 ml.) were brought together by adding dropwise the triethylamine to the mixture of the other reagents. The mixture was refluxed for 2½ hours. After filtration of the triethylamine hydrochloride, the solvent was removed at reduced pressure. There was obtained a quantitative yield of a yellow liquid, which analyzed in good agreement with the title compound, $n_D{}^{25}=1.5230$.

EXAMPLE 4

N - [2 - (O - ethyl - methylphosphonodithioyl)-ethyl]-methanesulfonamide.—To a solution of sodium (4.6 g.) in ethanol (100 ml.), N-(2-chloroethyl)methanesulfonamide (15.8 g.) and O-ethyl-methylphosphonodithioic acid (15.6 g.) were successively added. The mixture was refluxed for 2 hours and a heavy salt precipitation was obtained. The reaction mixture was poured into 200 ml. of water, acidified with hydrochloric acid and extracted with 3 portions of methylene chloride. The combined organic layers were dried over magnesium sulfate, filtered, and stripped of solvent. A yellow oil was obtained as the product at 1 mm. and 130° C., $n_D{}^{25}=1.5453$. Analysis was in accordance with the given title compound.

EXAMPLE 5

N - [(O - ethyl - methylphosphonodithioyl) - methyl]-N - (2-chloroethyl)-methanesulfonamide.—This member of the group was prepared by azeotroping O-ethyl-S-methylol-methylphosphonodithioate and N - (2 - chloroethyl)methanesulfonamide in benzene for 4 hours. There was obtained a viscous pale yellow oil, $n_D{}^{25}=1.5460$.

EXAMPLE 6

N - [2 - (O,O - diethyldithiophosphoryl) - ethyl]-methanesulfonamide.—N - β - bromoethylmethanesulfonamide (21.0 g.) was dissolved in 125 ml. of methanol. To this solution was added 31.2 g. of sodium diethyldithiophosphate and 4.0 ml. of triethylamine. The mixture was stirred and refluxed for 6 hours. The solvent and other volatiles were removed on a steam bath. The residue was taken up in ether, washed with water, dried over anhydrous magnesium sulfate, filtered and evaporated to give 25.0 g. (80.6% of theory yield) of liquid product, $n_D{}^{30}=1.5248$.

It should be mentioned that in place of methanol as a solvent there can be used methylethyl ketone, acetone or other alcohol. Use of triethylamine is optional. Other dithio salts, such as ammonium, potassium or the like may also be used.

EXAMPLE 7

N - methyl - N-[2-(O,O-diethylmonothiophosphoryl)-ethyl] - benzenesulfonamide.—N - methyl-N-(β-phenyl sulfonatoethyl)-benzenesulfonamide (17.8 g.) were dissolved in 75 ml. of methylethyl ketone. To this solution was added 15.4 g. of sodium diethylmonothiophosphate. The mixture was stirred and refluxed for one hour. The precipitated solid was filtered off and washed with methylethyl ketone. The filtrate and washings were combined and evaporated to a low volume. The residue was taken up in benzene, washed three times with water, dried over anhydrous magnesium sulfate, filtered, and the solvent removed on a steam bath. There was obtained a liquid 16.7 g. (91% yield), $n_D^{30}$=1.5332.

Using the method of the foregoing examples, the following compounds were prepared. Compound numbers have been assigned to each compound and are used hereinafter throughout the balance of the application for convenience.

*Tetranychus telarius* (Linn.), was employed in tests for acaricidal activity. Young pinto bean plants were infested with several hundred mites. Dispersions of test compounds were prepared by dissolving 0.10 gram of the candidate in ten milliliters of acetone. This solution was then diluted with water containing 0.0175% v./v. of Sponto 221®, an emulsifying agent. The amount of water was sufficient to give concentrations of active ingredient ranging from 0.10% to 0.001%. The test suspensions were sprayed on the infested pinto bean plants. After seven and fourteen days the plants were examined both for post-embryonic forms of the mite as well as for eggs. The percentage of kill was determined by comparison with control plants which had not been sprayed. The LC–50 value was calculated using well-known procedures. The LC–50 values are reported under the column "Two-Spotted Hite" in Table II; "PE" indicates post-embryonic forms while "E" indicates eggs.

*Systemic toxicity evluation.*—Some of the compounds

TABLE I

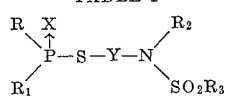

| Compound Number | R | $R_1$ | $R_2$ | $R_3$ | X | Y |
|---|---|---|---|---|---|---|
| 1* | $C_2H_5O$ | $C_2H_5O$ | H | $CH_3$ | S | $CH(CH_3)CH_2$ |
| 2* | $C_2H_5$ | $C_2H_5O$ | H | $CH_3$ | S | $CH(CH_3)CH_2$ |
| 3 | $C_2H_5$ | $CH_3O$ | H | $CH_3$ | S | $CH(CH_3)CH_2$ |
| 4* | $C_2H_5$ | $C_2H_5O$ | H | $CH_3$ | S | $CH_2CH_2$ |
| 5 | $CH_3$ | $CH_3O$ | H | $CH_3$ | S | $CH_2CH_2$ |
| 6 | $CH_3$ | $CH_3O$ | H | $CH_3$ | S | $CH(CH_3)CH_2$ |
| 7* | $CH_3$ | $C_2H_5O$ | H | $CH_3$ | S | $CH_2CH_2$ |
| 8* | $CH_3$ | $C_2H_5O$ | $CH_2CH_2Cl$ | $CH_3$ | S | $CH_2$ |
| 9 | $CH_3$ | $CH_3O$ | H | $CH_3$ | S | $CH(CH_3)CH_2$ |
| 10 | $C_2H_5$ | $CH_3O$ | H | $C_2H_5$ | S | $CH_2CH_2$ |
| 11 | $CH_3$ | $C_2H_5O$ | H | $C_2H_5$ | S | $CH_2CH_2$ |
| 12 | $CH_3O$ | $C_2H_5$ | H | $CH_3$ | S | $CH_2CH_2$ |
| 13 | $CH_3$ | $CH_3O$ | H | $C_2H_5$ | S | $CH_2CH_2$ |
| 14* | $C_2H_5O$ | $C_2H_5O$ | H | $CH_3$ | S | $CH_2CH_2$ |
| 15 | $C_2H_5O$ | $C_2H_5O$ | $CH_3$ | $C_6H_5$ | S | $CH_2CH_2$ |
| 16 | $i-C_3H_7O$ | $i-C_3H_7O$ | $CH_3$ | $C_6H_5$ | S | $CH_2CH_2$ |
| 17 | $CH_3O$ | $CH_3O$ | $CH_3$ | $C_6H_5$ | S | $CH_2CH_2$ |
| 18* | $C_2H_5O$ | $C_2H_5O$ | $CH_3$ | $C_6H_5$ | O | $CH_2CH_2$ |
| 19 | $C_2H_5O$ | $C_2H_5O$ | $C_2H_5$ | $C_6H_5$ | S | $CH_2CH_2$ |
| 20 | $C_2H_5O$ | $C_2H_5O$ | $C_2H_5$ | $C_6H_5$ | O | $CH_2CH_2$ |
| 21 | $C_2H_5O$ | $C_2H_5O$ | $C_2H_5$ | $C_6H_4Cl$ | S | $CH_2CH_2$ |
| 22 | $C_2H_5O$ | $C_2H_5O$ | $CH_3$ | $C_6H_4Cl$ | S | $CH_2CH_2$ |
| 23 | $C_2H_5O$ | $C_2H_5O$ | $CH_3$ | $C_2H_5$ | S | $CH_2CH_2$ |
| 24 | $CH_3O$ | $CH_3O$ | $CH_3$ | $C_2H_5$ | S | $CH_2CH_2$ |

*Compound No. 1 prepared in Example 1. Compound No. 2 prepared in Example 2. Compound No. 4 prepared in Example 3. Compound No. 7 prepared in Example 4. Compound No. 8 prepared in Example 5. Compound No. 14 prepared in Example 6. Compound No. 18 prepared in Example 7.

The class of compounds characterized by the foregoing examples has been found to have valuable pesticidal properties. The following tests demonstrate some of the pests on which the compounds were found active. The tests were conducted according to the following methods.

*Insecticidal evaluation test.*—The insect species, Housefly (HF)—*Musca domestica* (Linn.), was subjected to evaluation tests for insecticides. The test insects were caged in cardboard mailing tubes with cellophane bottoms and coarse mesh nylon tops. Each cage was supplied with food and water. The toxicant was dissolved in a volatile solvent, preferably acetone, the active compound was pipetted into a petri dish bottom, allowed to air dry and then placed in a cardboard mailing tube. Twenty-five female flies, three to five days old, were caged in the tube. The flies were continuously exposed to the known residue of the active compound in the cage. Final mortality readings were taken forty-eight hours after initiation of the test. The LD–50 values were calculated using well-known procedures. The results are listed in Table II under "HF."

*Acaricidal evaluation test.*—The two-spotted mite, of the present invention exhibited systemic toxicity against two-spotted mites. Pinto bean plants in the primary leaf stage were placed in bottles containing 200 ml. of the test solution and held in place with cotton plugs. One plant per flask was used. Only the roots were immersed. This test evaluates the root absorption and upward translocation of the candidate compound. The test solutions were prepared by dissolving the compound in 10 ml. of acetone. This solution was then diluted with distilled water, the amount of water being sufficient to give concentrations of active ingredient ranging from ten parts per million (p.p.m) to 0.1 part per million. Immediately after the plants were placed in the test solutions they were infested with mites, *Tetranychus telarius* (Linn.).

After seven and fourteen days the plants were axamined both for post-embryonic forms of the mite as well as eggs. The percentage of kill was determined by comparison with control plants which had been placed in distilled water only. Again the LD–50 value was calculated and reported in Table II under the column "Systemic."

TABLE II

| Compound No. | HF, μg. | Two-Spotted Mite | | |
|---|---|---|---|---|
| | | PE, percent | E, percent | Systemic p.p.m. |
| 1 | 50 | .03 | | |
| 2 | 100 | .003 | | |
| 3 | >100 | .003 | .05 | 3 |
| 4 | 80 | .001 | .05 | 3 |
| 5 | 8 | >.01 | | 1 |
| 6 | 100 | .0008 | .1 | 0.3 |
| 7 | 10 | >.01 | .001 | 1 |
| 8 | 70 | .005 | .1 | 0.5 |
| 9 | >100 | .008 | .008 | |
| 10 | 25 | .01 | >.05 | 5 |
| 11 | 30 | .0005 | .03 | 2 |
| 12 | 25 | .008 | .003 | 0.75 |
| 13 | 50 | .008 | .01 | 0.75 |
| 14 | 100 | .01 | .01 | 0.5 |
| 15 | 75 | .01 | .01 | 3 |
| 16 | 100 | .1 | .03 | |
| 17 | 10 | .1 | .1 | |
| 18 | 20 | .01 | .1 | |
| 19 | 50 | .05 | .05 | |
| 20 | 30 | .1 | .08 | |
| 21 | 100 | .05 | .1 | |
| 22 | 80 | .03 | | |
| 23 | 100 | .003 | .005 | 3 |
| 24 | 100 | .005 | | 8 |

The candidate compounds were also tested for fungicidal activity. Compounds 1, 2, 3, 6, 8 and 14 were found to have particularly good fungicidal activity, especially in the control of Bean rust. These compounds exhibited a particular effect in controlling fungus infection from the test species on the host plants.

The compounds of the present invention may be applied to a pest habitat in ways well-known to those skilled in the art, such as dusts, sprays of solutions or dispersions and the like. Aqueous as well as non-aqueous solutions are equally suitable.

Various changes and modifications may be made without departing from the spirit and scope of the invention described herein as will be apparent to those skilled in the art to which it pertains. It is accordingly intended that the present invention shall only be limited by the scope of the appended claims.

We claim:
1. A compound of the formula

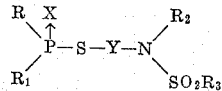

wherein R and $R_1$ are selected from the group consisting of lower alkoxy and lower alkyl groups, $R_2$ is selected from the group consisting of hydrogen, lower alkyl, lower haloalkyl; when $R_2$ is hydrogen $R_3$ is lower alkyl and when $R_2$ is lower alkyl and lower haloalkyl $R_3$ is selected from the group consisting of lower alkyl, phenyl and halophenyl, X is selected from the group consisting of sulfur and oxygen and Y is selected from the group consisting of divalent lower alkylene and lower alkylalkylene groups.

2. The compound N - [2 - (O,O-diethyl-phosphorodithioyl)-propyl]-methanesulfonamide.

3. The compound N - [2 - (O-ethyl-ethylphosphonodithioyl)-propyl]-methanesulfonamide.

4. The compound N - [(O - ethyl-methylphosphonodithioyl)-methyl]-N-(2-chloroethyl)-methanesulfonamide.

5. The compound N - methyl-N-[2-(O,O-diethylmonothiophosphoryl)-ethyl]-benzenesulfonamide.

6. The compound N - ethyl - N-[2-(O,O-diethyldithiophosphoryl)-ethyl]-p-chlorobenzenesulfonamide.

References Cited

UNITED STATES PATENTS 3,205,253  9/1965  Fancher et al. _____ 260—944

CHARLES B. PARKER, *Primary Examiner.*

B. BILLIAN, *Assistant Examiner.*